(12) United States Patent
Takahashi et al.

(10) Patent No.: US 7,938,381 B2
(45) Date of Patent: May 10, 2011

(54) ELECTROMAGNETIC VALVE

(75) Inventors: Michio Takahashi, Nagano (JP);
Takaaki Komaba, Nagano (JP); Takuyo Shimono, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 357 days.

(21) Appl. No.: 12/022,410

(22) Filed: Jan. 30, 2008

(65) Prior Publication Data
US 2008/0185548 A1   Aug. 7, 2008

(30) Foreign Application Priority Data
Feb. 1, 2007  (JP) .............................. P.2007-022565

(51) Int. Cl.
*F16K 31/02*   (2006.01)
(52) U.S. Cl. .................. 251/129.02; 251/122
(58) Field of Classification Search .................. 251/122, 251/129.02, 129.15
See application file for complete search history.

(56) References Cited

U.S. PATENT DOCUMENTS

| | | | |
|---|---|---|---|
| 5,199,769 A | 4/1993 | Beck et al. | |
| 5,522,426 A | 6/1996 | Zutt et al. | |
| 5,556,175 A | 9/1996 | Hayakawa et al. | |
| 5,725,289 A * | 3/1998 | Mueller et al. | 303/119.2 |
| 5,785,297 A * | 7/1998 | Ha | 251/129.14 |
| 6,254,199 B1 * | 7/2001 | Megerle et al. | 303/119.2 |
| 6,523,913 B1 * | 2/2003 | Lauer et al. | 303/119.2 |
| 7,168,679 B2 * | 1/2007 | Shirase et al. | 251/129.02 |
| 7,467,780 B2 * | 12/2008 | Kratzer | 251/129.02 |
| 2005/0001190 A1 | 1/2005 | Shirase et al. | |

FOREIGN PATENT DOCUMENTS

| | | |
|---|---|---|
| EP | 0 670 445 | 10/1993 |
| EP | 1 484 539 | 12/2004 |

(Continued)

OTHER PUBLICATIONS

Office Action of Jul. 31, 2008 issue in the corresponding Chinese Application No. 200810004991 5.

(Continued)

*Primary Examiner* — John K Fristoe, Jr.
(74) *Attorney, Agent, or Firm* — Andrew M. Calderon; Roberts Mlotkowski Safran & Cole, P.C.

(57) ABSTRACT

An electromagnetic valve has a fixed core, a movable core, a coil attract the fixed core and the movable core each other, a valve body and a valve seat member including a funnel-shaped valve seat surface and an inlet path. The flow path is closable by retreat/advance of the valve body relative to the valve seat surface. The valve body includes a semi-spherical seal portion and a stem portion extending from the seal portion towards the movable core, a diameter of an end portion of the seal portion at the stem portion side is larger than a diameter of an end portion of the stem portion at the seal portion side. A space is defined in an area located on an extended line extending from a small diameter end portion to a large diameter end portion of the valve seat surface.

17 Claims, 5 Drawing Sheets

FOREIGN PATENT DOCUMENTS

| | | |
|---|---|---|
| GB | 933758 | 3/1962 |
| GB | 1 221 185 | 12/1967 |
| GB | 2 204 381 | 4/1987 |
| JP | 6193764 | 7/1994 |
| JP | 8501375 | 2/1996 |
| JP | 10500923 | 1/1998 |
| JP | 2000512585 | 9/2000 |
| JP | 2002525524 | 8/2002 |
| JP | 2004-360750 | 12/2004 |
| JP | 2002-347597 | 12/2007 |

OTHER PUBLICATIONS

European Search Report for corresponding European Application No. 08001804.7.

Office Action for corresponding Japanese Application No. 2007-022565 dated Oct. 4, 2010 (English translation attached) Mailing date Oct. 12, 2010.

\* cited by examiner

ELECTROMAGNETIC VALVE

BACKGROUND OF THE INVENTION

1. Field of the Invention

The present invention relates to an electromagnetic valve which includes a valve body for opening and closing a flow path of fluid.

2. Description of Related Art

In general, an electromagnetic valve (solenoid valve) is configured to have a coil, a fixed core and a movable core and generates a magnetic field by an electric current being caused to flow through the coil so as to attract the movable core towards the fixed core to thereby open and close the valve.

For example, an electromagnetic valve includes a funnel-shaped valve seat surface which is provided in an upper portion of a cylindrical valve seat element (a valve seat member) so as to be diametrically enlarged upwards, and a valve body having a semi-spherical distal end face is pressed against the valve seat surface so as to close a flow path in which fluid flows upwards from below (refer to FIG. 2 of JP-A-2004-360750)

Incidentally, in the electromagnetic valve, the action of the valve body largely influences a performance of the electromagnetic valve. For example, when the flow of fluid flowing towards the valve body is unstable, there emerges a situation where operation noise is generated by the valve body. In addition, there is a fear that the unstable movement of the valve body triggers a pulsation in fluid pressure in a hydraulic apparatus.

In the electromagnetic valve of JP-A-2004-360750, in view of these situations, the valve body takes a shape in which a tapered surface which is diametrically enlarged upwards extends continuously from the semi-spherical distal end face thereof. By taking the shape described above, it is expected that fluid, which flows upwards from below when the electromagnetic valve is opened, flow along the tapered surface of the valve body.

Figure 3A:
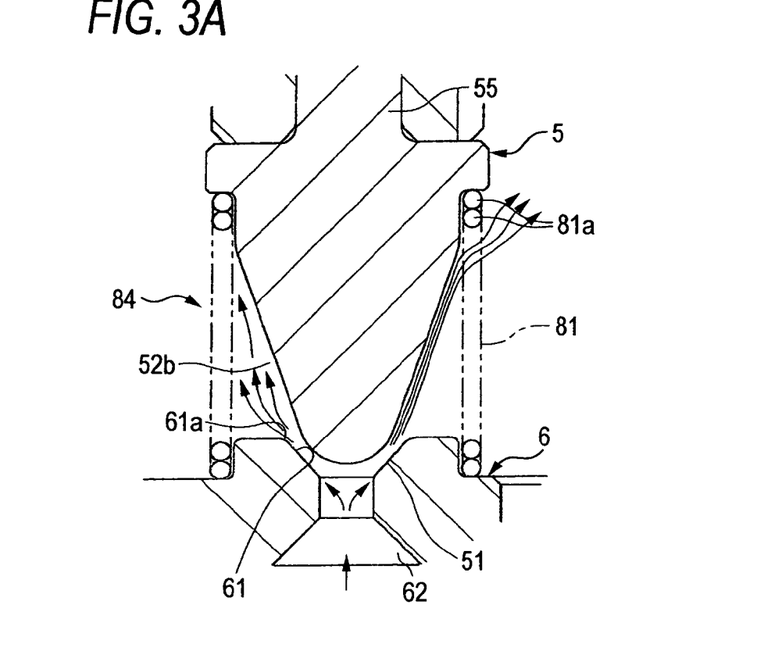
FIG. 3A is a diagram showing flows of fluid which pass between a valve seat surface and a valve body in a conventional normally open electromagnetic valve.

As is shown in FIG. 3A, however, when adopting a valve body configuration like the one disclosed in JP-A-2004-360750, since fluid which flows from an inlet path 62 below towards a valve body 5 is attracted towards both the valve body 5 and a valve seat surface 61, on one side (for example, a right-hand side in FIG. 3A), fluid flows along the valve body 5, and on the other side (for example, a left-hand side in FIG. 3A), there is a fear that fluid is separated from the valve body 5 to thereby be caused to flow along the valve seat surface 61.

Figure 3B:
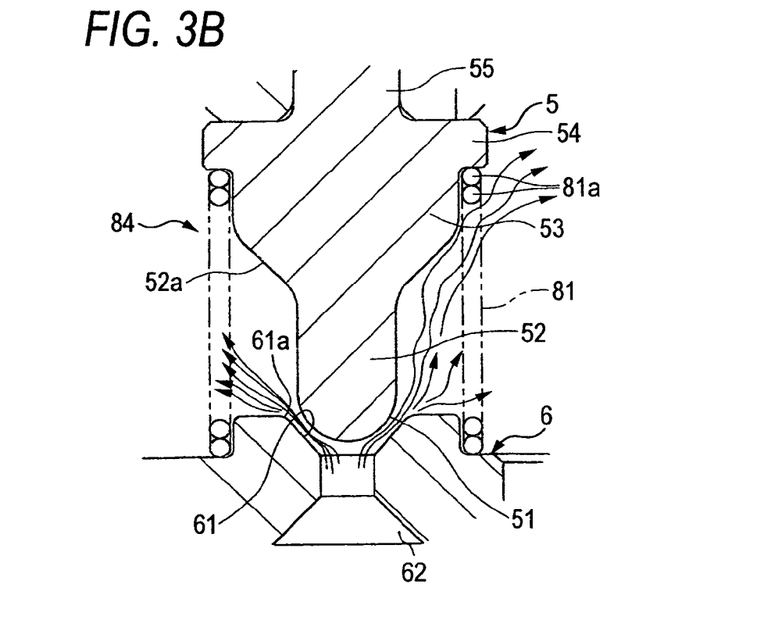
FIG. 3B is a diagram showing flows of fluid which pass between a valve seat surface and a valve body in a normally open electromagnetic valve which is taken by reference.

In addition, also when adopting a valve body 5 as is shown in FIG. 3B in which a stem portion 52 is smoothly connected to a semi-spherical distal end (a seal portion 51), there is a fear that whether fluid flows along the valve body 5 or along a valve seat surface 61 becomes uncertain.

In valve bodies like those described above in which the flow of fluid tends to become uncertain, when actually assembled to electromagnetic valves, some operate properly and others do not. Due to this, there is a possibility that even with a minor production error or assembly error, an expected performance cannot be exhibited, and the performance of electromagnetic valves is caused to vary largely. Furthermore, the flow of fluid along the valve body 5 reaches as far as a portion of a return spring 81 for biasing the valve body 5, which is wound round a seat of the valve body 5, to thereby apply a force to the return spring 81. Thus, there is caused a problem that the controllability of the electromagnetic valve is worsened.

SUMMARY OF THE INVENTION

In view of the above, a problem that the invention is to solve is how to provide an electromagnetic valve which can stabilize the flow of fluid which flows between the valve seat surface and the valve body and which can realize the suppression of operation noise and the stabilization of the performance of the electromagnetic valve itself.

With a view to solving the problem, according to an aspect of the invention, there is provided an electromagnetic valve including:

a fixed core;

a movable core disposed so as to advance and retreat relative to the fixed core;

a coil which generates a magnetic field which causes the fixed core and the movable core to attract each other;

a valve body disposed so as to move together with the movable core; and a valve seat member including:

a funnel-shaped valve seat surface which closes a flow path by being brought into abutment with the valve body and an inlet path formed in a bottom of the valve seat surface, wherein fluid flows from the inlet path towards the valve body side, the flow path is opened and closed by retreat and advance of the valve body relative to the valve seat surface, the valve body includes:

a semi-spherical seal portion; and a stem portion which extends from the seal portion towards the movable core, wherein a diameter of an end portion of the seal portion at the stem portion side is larger than a diameter of an end portion of the stem portion at the seal portion side, and a space into which the fluid flows out is defined in an area which is located on an extended line extending from a small diameter end portion to a large diameter end portion of the valve seat surface.

Thus, according to the invention, the diameter of the end portion of the semi-spherical seal portion of the valve body which faces the stem portion is larger than the stem portion and thus a difference in level (e.g., step etc.) is formed between the seal portion and the stem portion. Therefore, even though the fluid which has arrived after having passed through between the valve body and the valve seat surface attempts to flow along the valve body, the fluid cannot follow the stem portion from the portion where the difference in level is produced, and hence, the flow of fluid is separated from the valve body in an ensured fashion. Due to this, the fluid necessarily flows along the valve seat surface, whereby the flow of fluid is stabilized.

In addition, in the direction in which the large diameter end portion side of the valve seat surface, formed is the space into which the fluid flowing along the valve seat surface flows, as has been described above, the fluid can be surely separated from the valve body so as to be allowed to flow along the valve seat surface.

Furthermore, in the electromagnetic valve, the valve body preferably includes a large diameter portion which is provided closer to the movable core than the stem portion and which has a larger diameter than the stem portion and a diameter expanding portion whose diameter is gradually increased from the stem portion towards the large diameter portion. Due to this diameter expanding portion, the flow of fluid which has flowed out from the valve seat surface is disturbed in no way, thereby making it possible to realize a stable flow of fluid.

In addition, since the flow of fluid along the valve seat surface does not impart any unnecessary force to a portion of the return spring for biasing the valve body which is wound round the seat of the valve body, the controllability of the electromagnetic valve can be improved.

In the event that the electromagnetic valve of the invention is a normally open electromagnetic valve in which the movable core moves the valve body in a valve closing direction by the coil being energized, the invention becomes particularly advantageous.

In addition, by including a retainer which is formed separately from the valve body and is adapted to transmit the movement of the movable core to the valve body, the workability of the valve body can be increased.

In the electromagnetic valve of the invention, the valve body and the movable core may be integrated with each other.

According to the electromagnetic valve of the invention, it is possible to stabilize the flow of fluid which has flowed through between the valve seat surface and the valve body, to suppress the operation noise of the electromagnetic valve and to stabilize the performance of the electromagnetic valve itself.

DETAILED DESCRIPTION OF THE PREFERRED EMBODIMENTS

Embodiment

Next, referring to the drawings as required, an embodiment of the invention will be described in detail. In the drawings to be referred to, FIG. 1 is a vertical sectional view showing a normally open electromagnetic valve according to an embodiment of the invention, FIG. 2A is an enlarged view showing a state in which a valve body is separated from a valve seat member to form an opening therebetween, and FIG. 2B is an enlarged view showing a flow of fluid through the opening formed when the valve body is separated from the valve seat member.

Figure 1:
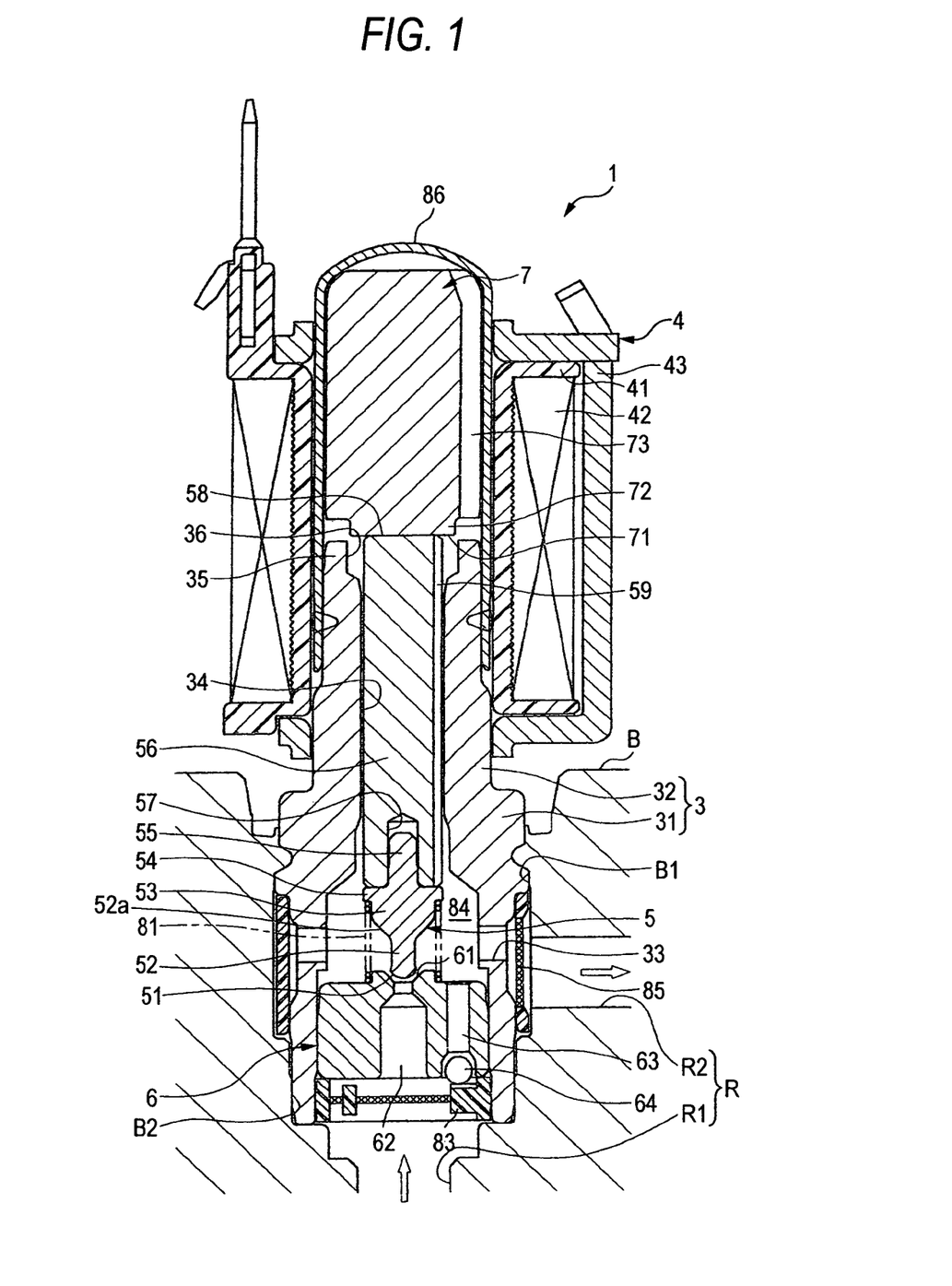
FIG. 1 is a vertical sectional view showing a normally open electromagnetic valve according to an embodiment of the invention.
Figure 2A:
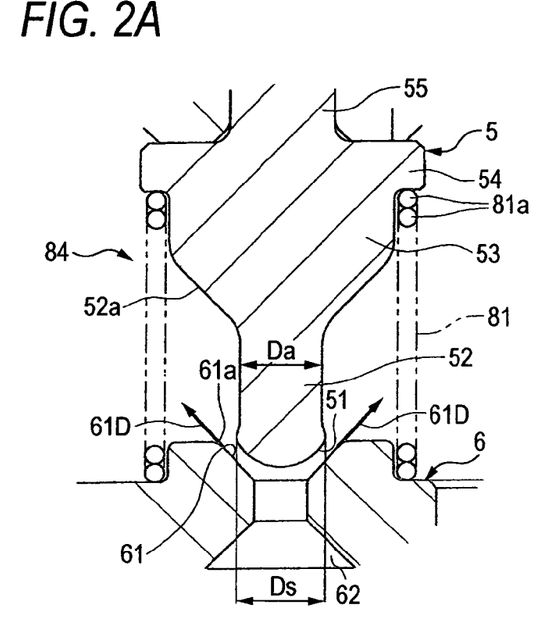
FIG. 2A is an enlarged view showing a state in which a valve seat member and a valve body stay apart from each other to open the valve.
Figure 2B:
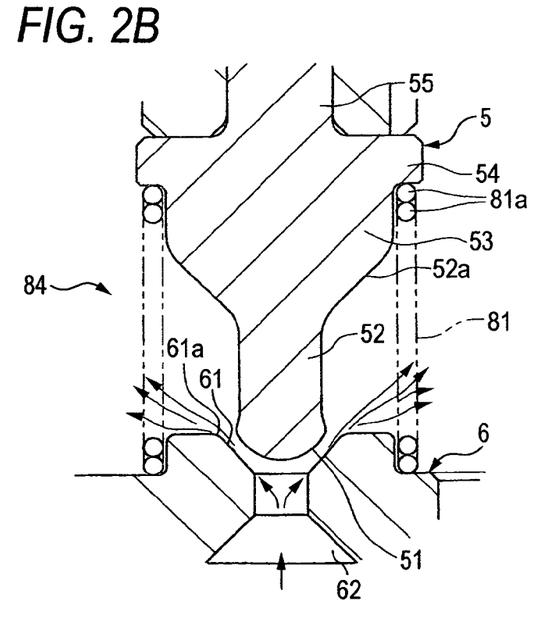
FIG. 2B is an enlarged view showing flows of fluid when the valve seat member and the valve body stay apart from each other.

As is shown in FIG. 1, a normally open electromagnetic valve 1 is a valve for switching the closing and opening of a flow path R formed in a base body B of an anti-lock brake system and is configured to include mainly a fixed core 3, a coil unit 4, a valve body 5, a valve seat member 6 and a movable core 7.

In this normally open electromagnetic valve 1, the valve body 5 is normally separated from the valve seat member 6 so as to permit a flow of fluid from a flow path R1 which connects to a lower side (as a matter of convenience, whether upper/upwards or lower/downwards being determined based on FIG. 1) to a flow path R2 which connects to a side portion of the valve. Then, when the valve body 5 is brought into abutment with the valve seat member 6 by the coil unit 4 being energized, the flow path R is closed, whereby the flow of fluid is interrupted.

In addition, In the normally open electromagnetic valve of the embodiment, when a difference between the pressure of fluid in the flow path R1 and the pressure of fluid in the flow path R2 is equal to or more than a predetermined value, a flow of fluid produced due to the difference in pressure overcomes a valve closing force applied to the valve body 5, whereby the flow path R is made to be opened. Namely, the normally open electromagnetic valve 1 is a linear electromagnetic valve (a differential pressure control valve) which can control the closing force of the valve body 5 according to the value of electric current which is caused to flow the coil unit 4 for energization.

The fixed core 3 is also functioning as a housing which accommodates the respective components and is a cylindrical member having a vertical through hole. The fixed core 3 is made up of a body portion 31 which is mounted in the base body B and a core portion 32 which is formed with an outside diameter which is smaller than that of the body portion 31 and which extends upwards. The valve body 5 and the valve seat member 6 are accommodated in an interior of the body portion 31.

In the valve body 5, a seal portion 51, which is formed into a semi-spherical shape, is formed at a distal end of the valve body 5, and a cylindrical stem portion 52 connects to the seal portion 51 so formed. A large diameter portion 53 having a large diameter than the stem portion 52 is formed on the stem portion 52. The stem portion 52 and the large diameter portion 53 are formed into a shape in which the stem portion 52 and the large diameter portion 53 are connected together by a diameter expanding portion 52a which is made up of a tapered shape. Namely, the diameter of the valve body 5 is gradually increased from the stem portion 52 towards the large diameter portion 53. A flange portion 54 having a larger diameter than the large diameter portion 53 is provided further on the large diameter portion 53. A connecting pin 55 is formed on the flange portion 54 so as to extend upwards therefrom.

The valve seat member 6 is a flat cylindrically shaped member, and a funnel-shaped valve seat surface 61 is formed in a center of an upper surface thereof, an inlet path 62 is formed in a bottom of the valve seat surface 61 so as to pass through the bottom vertically. This inlet path is a passage through which fluid is caused to flow from below the normally open electromagnetic valve 1 into a valve chamber 84 defined above the valve seat member 6. In addition, a return flow path 63 is formed in the valve seat member 6 so as to pass therethrough vertically in a position which is offset radially outwards from the inlet path 62. A ball valve 64 is disposed in a lower portion of the return flow path 63, so as to make up a check valve together with the return flow path 63. The ball valve 64 is prevented from being dislocated or falling by a filter 83 which is press fitted in an inside diameter at a lower end of the body portion 31.

The valve seat member 6, which is configured as has been described above, is press fitted in an inner circumference of the body portion 31 for fixation in place therein.

A return spring 81 for generating a biasing force for keeping the valve body 5 apart from the valve seat member 6 is disposed between an upper surface of the valve body 5 and the flange portion 54.

A plurality of through holes 33 is formed in a side wall of the body portion 31, so as to establish a communication between an inside and an outside of the body portion 31. A cylindrical filter 85 is fitted on an outside of a portion of the body portion 31 where the through holes 33 are formed, so as to remove foreign matters contained in fluid which passes through the body portion 31.

The body portion 31 is inserted into a mounting hole B1 in the base body B and is then fixed in place by caulking round a circumference of the mounting hole B1. In addition, the lower end of the body portion 31 is press fitted in a press fit portion B2 of the mounting hole B1 which is formed with the next smaller diameter.

A cylindrical surface 34, which has the next smaller diameter than the diameter of the valve chamber 84, is formed in an interior of the core portion 32, and a rod-shaped retainer 56 for operating the movable core 7 and the valve body 5 integrally is disposed separately from the valve body 5 within the cylindrical surface 34. A connecting hole 57 is formed in a lower end face of the retainer 56, and this connecting hole 57 is fitted on the connecting pin 55 of the valve body 5, whereby the retainer 56 moves together with the valve body 5. Since the retainer 56 is biased upwards together with the valve body 5 by the return spring 81, an upper surface 58 of the retainer 56 is brought into abutment with a lower end face 71 of the movable core 7.

A plurality of grooves 59 (only one of them is shown) are formed in a side surface of the retainer 56 so as to extend along the full length thereof. These grooves 59 allow fluid stored above or below the retainer 56 to move therethrough when the retainer 56 moves vertically so as to attain a smooth motion of the retainer 56.

An upper end portion 35 of the core portion 32 is formed slightly larger in inside diameter than the cylindrical surface 34. This inside diameter is made to be a size which allows a raised portion 72 on the movable core 7, which will be described later, to fit therein. Namely, a recessed portion 36 which can accommodate a distal end of the raised portion 72 is formed on an upper surface of the core portion 32. The fixed core 3 is made of a magnetic material, and when the fixed core 3 is energized by the coil unit 4, the fixed core 3 functions to attract the movable core 7 so as to close the valve.

The movable core 7 is a cylindrical member made of a magnetic material which is disposed on an upper portion of the retainer 56. A groove 73 is formed on a side surface of the movable core 7 so as to extend along the full length thereof, so as to allow fluid stored above or below the movable core 7 to move therethrough when the movable core 7 moves vertically, whereby a smooth motion of the movable core 7 is attained.

A central portion of the lower end face 71 of the movable core 7 is caused to project in a circular contour to form the raised portion 72. As has been described above, this raised portion 72 faces the recessed portion 36 on the upper surface of the fixed core 3 and is sized to fit in the recessed portion 36.

The shapes of the raised portion 72 and the recessed portion 36 and the positional relationship therebetween are such as to improve the function of the normally open electromagnetic valve as the linear electromagnetic valve. Namely, while the movable core 7 moves and the raised portion 72 and the recessed portion 36 approach each other by causing an electric current to flow through the coil 42, they are so shaped and positioned in order to decrease a change in magnetic force with which the movable core 7 and the fixed core 3 attract each other according to a change in distance between the movable core 7 and the fixed core 3 as the movable core 7 and the fixed core 3 attract each other.

A bottomed cylindrical guide tube 86 is fitted on the core portion 32 from the outside and is fixed thereto by means of welding. The movable core 7 is accommodated within the guide tube 86 so as to be guided with respect to vertical advancing and retreating motions.

The coil unit 4 is made up of a bobbin 41 which is made of resin and the coil 42 which is formed thereround, and a yoke 43 is disposed on an outside of the bobbin 41 for forming a magnetic path.

Next, the valve seat member 6 and the valve body 5 will be described in detail.

As is shown in FIG. 2A, in the valve body 5, a diameter Ds of the end portion of the seal portion 51 which faces the stem portion 52 is formed slightly larger than a diameter Da of the stem portion 52. Due to this, although it is moderate, a step is formed at a portion where the seal portion 51 connects to the stem portion 52.

The seal portion 51 is formed into the semi-spherical shape. In addition, the valve seat surface 61 is formed into the funnel shape which is diametrically enlarged with a constant gradient.

Disposed on an extension of a direction (indicated by an arrow 61D) directed from a small diameter side to a large diameter side (a large diameter end portion 61a) of the valve seat surface 61 is no member so as to lie adjacent to the large diameter end portion 61a, but a space (the valve chamber 84) is formed so that fluid can freely flow out in the direction indicated by the arrow 61D. Of course, although as has been described above, the return spring 81 is disposed in a position which is spaced apart a predetermined distance from the large diameter end portion 61a, the return spring 81 is such that a thin spring steel wire is wound into a spiral shape with a gap provided between turns of the wire which is wide enough to such an extent as to eliminate the possibility of interruption to the flow of fluid towards the direction indicated by the arrow 61D.

The function and advantage of the normally open electromagnetic valve 1 will be described which is configured as has been described above.

In the normally open electromagnetic valve 1, the valve body 5 is normally kept apart from the valve seat surface 61 by the return spring 81, and fluid is allowed to flow freely from the flow path R1 to the flow path R2.

Then, when the coil 42 is energized, the fixed core 3 and the movable core 7 are, in turn, energized to thereby be caused to attract each other, whereby the seal portion 51 is brought into abutment with the valve seat surface 61, and the flow path R1 and the flow path R2 are cut off from each other. However, the valve closing force is determined by the magnitude of electric current which is caused to flow to energize the coil 42, and when a difference between the pressure of fluid in the flow path R1 and the pressure of fluid in the flow path R2 exceeds an actuating differential pressure which is determined by the valve closing force, the fluid pushes up the valve body 5, whereby the fluid is allowed to flow from the flow path R1 to the flow path R2. Namely, the normally open electromagnetic valve functions as the linear electromagnetic valve (the differential pressure control valve).

When the fluid flows, the fluid flows from the inlet path 62 into the valve chamber 84 after having passed between the seal portion 51 of the valve body 5 and the valve seat surface 61, as is shown in FIG. 2B. As this occurs, since the fluid is the form of liquid, the fluid attempts to flow along the surface of an object. Namely, the fluid attempts to flow along both the seal portion 51 of the valve body 5 and the valve seat surface 61.

In the normally open electromagnetic valve 1 of the embodiment, due to a structure in which the end portion of the seal portion 51 which lies to face the stem portion 52 is formed larger in diameter than the stem portion 52, although the shape of a step is moderate, a step is formed on an area defined from the spherical surface of the seal portion 51 to a surface of the stem portion 52. (That is, the area is a portion where the seal portion 51 connects to the stem portion 52.)

Due to this configuration, the fluid which has flowed thereto along the surface of the seal portion 51 flows apart from the valve body 5 at the end portion of the seal portion 51 which lies to face the stem portion 52 and continues to flow along the valve seat surface 61. Then, the fluid flows along the valve seat surface 61 while expanding diametrically and also flows apart from the valve seat surface 61 at the large diameter end portion 61*a* of the valve seat surface 61, flowing out into the space open in the direction of the large diameter end portion 61*a* (refer to the arrow 61D in FIG. 2A).

As this occurs, since the flow of the fluid, which has flowed into the space after having passed between the seal portion 51 and the valve seat surface 61, does not strike the portion 81*a* of the return spring 81 which is wound round the seat of the valve body 5, there emerges no situation in which the fluid disturbs the action of the return spring 81, thereby making it possible to control the electromagnetic valve properly.

The function and advantage that have been described heretofore are compared with those of conventional valve bodies. FIG. 3A is a diagram showing flows of fluid which pass between a valve seat surface and a valve body of a conventional normally electromagnetic valve. FIG. 3B is a diagram showing flows of fluid which pass between a valve seat and a valve body of a normally open electromagnetic valve which is taken by reference with respect to the configuration of a valve body and a valve seat surface. Note that like reference numerals will be given to portions like to those shown in FIGS. 1 and 2.

As is shown in FIG. 3A, when a distal end (a seal portion 51) of a valve body 5 is formed into a semi-spherical shape and a taper shape 52*b* is formed in such a way as to smoothly continue to the seal portion, fluid flows differently depending upon time and position. That is, fluid flows along the valve body 5 as indicated by arrows in a right-hand half portion, while in a left-hand half portion, fluid flows along a valve seat surface 61. Namely, since the seal portion 51 and the taper shape 52*b* continue to each other smoothly in a portion where they connect to each other, since the fluid attempts to flow along the valve seat surface 61, while the fluid attempts to flow along the valve body 5, whether the fluid flows along the valve body 5 or the valve seat surface 61 varies temporally and is not determined.

In addition, since the fluid which has flowed along the taper shape 52*b* continues to flow in a straight line to strike an upper portion 81*a* of a return spring 81 which is wound round a seat of the valve body 5, an unnecessary external force is applied to the return spring 81 and moreover, such an external force is applied thereto in an uncertain fashion. Due to this, the operation performance of the return spring 81 is not stabilized, this making difficult to control the normally open electromagnetic valve 1.

An example shown in FIG. 3B is such that a seal portion 51 of a valve body 5, which lies at a distal end thereof, is formed into a semi-circular shape and a cylindrical stem portion 52 is connected continuously and smoothly to the seal portion. Also, in this example, fluid flows along the valve body 5 on a right-hand side of the valve body 5, while fluid flows along a valve seat surface 61 on a left-hand side of the valve body 5, and in this way, the fluid flows differently depending on time and position. Namely, due to the seal portion 51 being connected continuously to the stem portion 52, since the fluid attempts to flow along the valve seat surface 61 on one side and the fluid attempts to flow along the valve body 5 on the other side, whether the fluid flows along the valve body 5 or the valve seat surface 61 varies temporally and is not determined.

In addition, as same as the case illustrated in FIG. 3A, since the fluid which has flowed along the stem portion 52 continues to flow along the valve body 5 in the same way to strike an upper portion 81*a* of a return spring 81 which is wound round a seat of the valve body 5, an unnecessary external force is applied to the return spring 81 and moreover, such an external force is applied thereto in an uncertain fashion. Due to these phenomenon, the operation performance of the return spring 81 is not stabilized, this making difficult to control the normally open electromagnetic valve 1.

However, in the normally open electromagnetic valve 1 of the embodiment of the invention, since the end portion of the seal portion 51 which lies to face the stem portion 52 is made larger in diameter than the stem portion 52, the fluid surely flows apart from the valve body 5 and surely flows along the valve seat surface 61. Consequently, the flow of fluid becomes more stable than those of the conventional examples, whereby operation noise which would otherwise be generated by the valve body 5 and the fluid can be suppressed. In addition, due to the flow of fluid being stabilized with ease, even though there is a minor production error, the operation of the valve body is not affected thereby, and the stability in performance of the electromagnetic valve itself can be attained.

Furthermore, as a result of the flow of fluid becoming stable, a change in pressure of fluid or a so-called pulsation is suppressed.

In addition, since no unnecessary force is applied to the portion 81*a* of the return spring 81 which is wound round the seat of the valve body 5, the operation performance of the return spring 81 becomes stable, thereby making it possible to control the normally open electromagnetic valve 1 properly.

In addition, in the normally open electromagnetic valve 1 of the embodiment, since the diameter expanding portion 52*a* is provided in which the diameter of the valve body 5 gradually increases from the stem portion 52 towards the large diameter portion 53, the flow of fluid which has flowed from the valve seat surface 61 is not disturbed, thereby making it possible to realize a stable flow of fluid.

While the embodiment of the invention has been described heretofore, the invention is not limited to the embodiment so described but can be carried out by being modified as required.

For example, while in the embodiment, the valve body 5 and the movable core 7 are configured as the separate members and the retainer 56 is provided to make them move integrally, whether or not the retainer 56 is provided is arbitrary, and the valve body 5 and the movable core 7 can be configured as an integral unit.

In addition, the shape of the stem portion 52 of the valve body 5 may be in any shape such as a polygonal prism other than a circular cylinder, as long as the stem portion 52 is smaller in outside diameter than the diameter of the portion of the seal portion 51 which lies to face the stem portion 52.

Furthermore, there is imposed no specific limitation on the angle of the valve seat surface 61, as long as the valve seat surface 61 is allowed to be brought into abutment with the seal portion 51 so as to close the valve.

First Modified Embodiment

In addition, while in the embodiment, the invention is applied to the linear electromagnetic valve in which the actuating differential pressure is changed according to the value of electric current which is caused to flow through the coil 42, the invention may be applied to a normally open electromagnetic valve in which the actuating differential pressure is not changed. For example, FIG. 4 is a vertical sectional view of another embodiment of a normally open electromagnetic valve.

Figure 4:
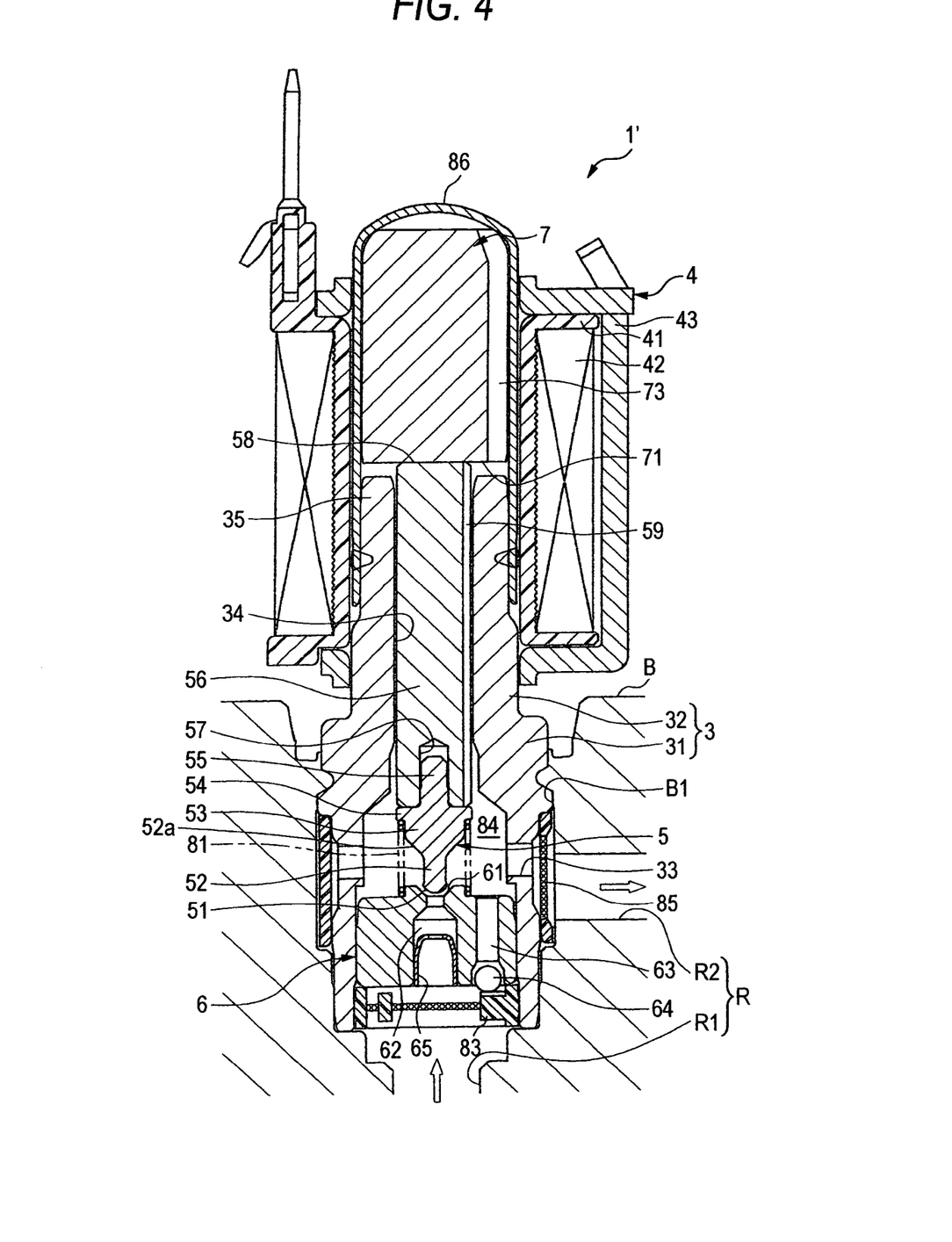
FIG. 4 is a vertical sectional view of a normally open electromagnetic valve of first modified embodiment.

In a normally open electromagnetic valve 1' which is shown in FIG. 4, only portions thereof will be described which are different from those of the normally open electromagnetic valve shown in FIG. 1. In the normally open electromagnetic valve 1', the raised portion 72 and the recessed portion 36 which are provided in the normally open electromagnetic valve 1 are omitted, and hence, a lower end face 71 of a movable core 7 is formed flat, and an upper end face of a fixed core 3 is also formed flat. In addition, an orifice 65 is disposed in an inlet path 62 which is formed in the center of a valve seat member 6 for constricting the inlet path 62.

Also, in the normally open electromagnetic valve 1' which is configured as described above, in such a state that a valve body 5 normally stays apart from a valve seat surface 61 so as to allow fluid to flow from the inlet path 62 into a valve chamber 84, momentarily a coil 42 is energized so that the valve body 5 is brought into abutment with the valve seat surface 61, as with the normally open electromagnetic valve 1, fluid flows out from the inlet path 62 into the valve chamber 84 through a slight gap between a seal portion 51 of the valve body 5 and the valve seat surface 61. As this occurs, as with the normally open electromagnetic valve 1, since the fluid necessarily flows along the valve seat surface 61, the operation of the valve body 5 is stabilized, and there emerges no situation in which unnecessary operation noise is produced.

Second Modified Embodiment

In addition, the invention can be applied not only to the normally open electromagnetic valve but also to a normally closed electromagnetic valve which is closed normally.

Figure 5:
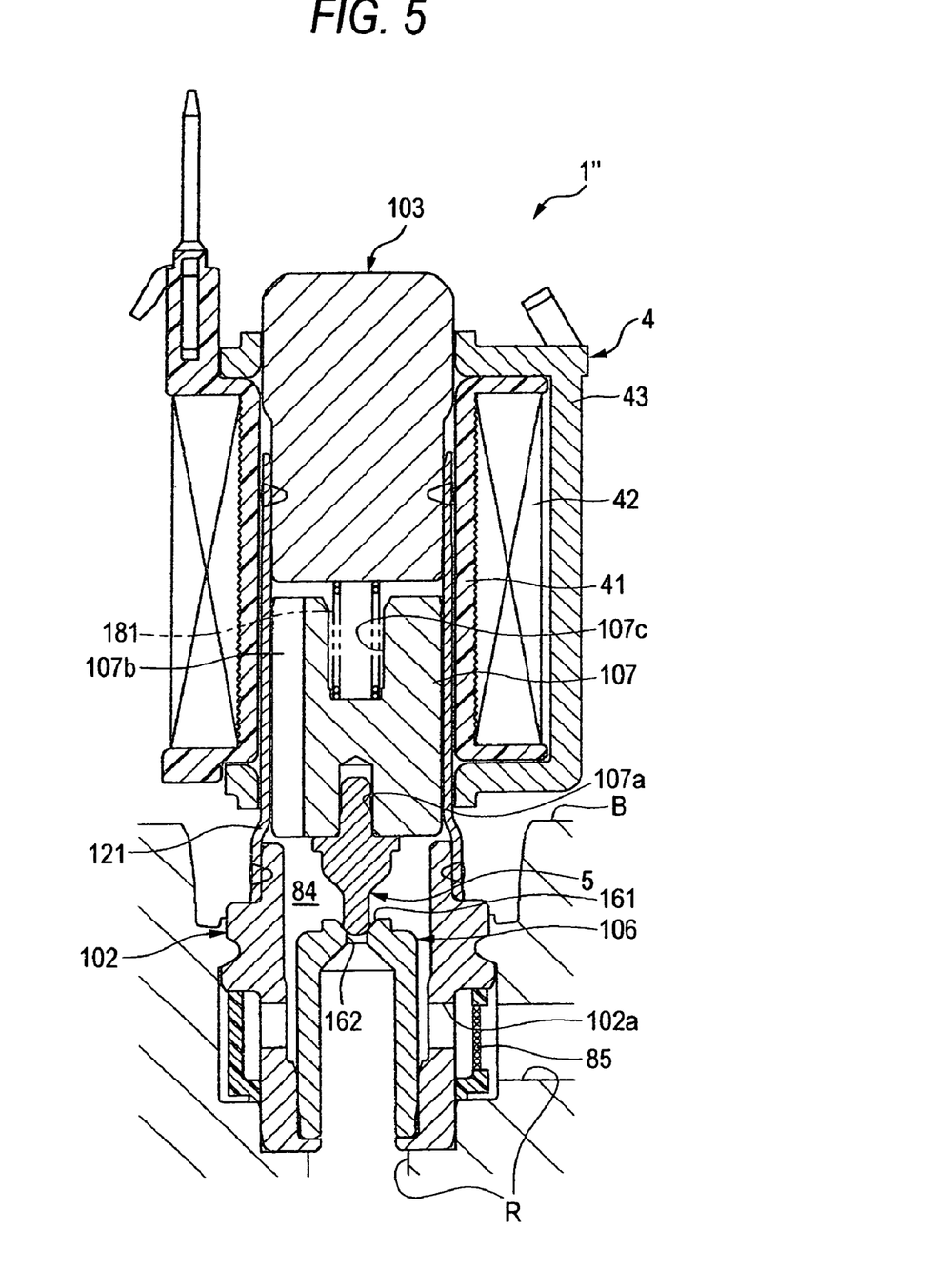
FIG. 5 is a sectional view of a normally closed electromagnetic valve of second modified embodiment.

For example, FIG. 5 is a sectional view of a normally closed electromagnetic valve. Note that in FIG. 5, like reference numerals will be given to portions like to those in FIG. 1, and the detailed description thereof will be omitted.

As is shown in FIG. 5, a normally closed electromagnetic valve 1" is such as to switch between closing and opening of a flow path R which is formed in a base body B of an anti-lock brake system and is configured to include mainly a housing 102, a fixed core 103, a coil unit 4, a valve body 5 and a valve seat member 106.

The housing 102 is formed substantially into a circular cylinder shape and the valve seat member 106 is press fitted in an interior of the housing 102. An opening 102a is formed in a side wall of the housing 102, and a flow path R is formed between the opening 102a so formed and an opening which is made open at a lower end of the housing 102.

A guide tube 121 is formed into a circular cylinder shape and the fixed core 3 is fixed to an upper portion of the guide tube 121 by means of fitting and welding, while the housing 102 is fixed to a lower end portion thereof by means of fitting and welding.

The valve body 5 is connected into a connecting hole 107a formed in a lower end of the movable core 107 so as to operate together with the movable core 107. The movable core 107 is guided by the guide tube 121 when it advances and retreats vertically.

A groove 107b is formed on the movable core 107 along the full length thereof, so that fluid stored above and below the movable core 107 is allowed to flow vertically therethrough. A bottomed hole 107c is formed in an upper surface of the movable core 107, and a return spring 181 is disposed in the hole 107c so formed. The return spring 181 normally produces a biasing force between the fixed core 103 and the movable core 107, so as to normally push the movable core 107 and the valve body 5 towards a valve seat surface 161 of the valve seat member 106. Namely, the flow path R is normally closed.

Also, in the normally closed electromagnetic valve 1" configured as has been described above, as is illustrated in the embodiment, a diameter (Ds in FIG. 2) of an end portion of a seal portion 51 of the valve body 5 at the stem portion 52 side is formed larger than a diameter (Da in FIG. 2) of the stem portion 52, and a step is formed in a portion where the stem portion 52 connects to the seal portion 51. Due to this, fluid which has flowed into a valve chamber 84 from an inlet path 162 necessarily flows apart from the valve body 5 and flows along the valve seat surface 161. Consequently, the flow of fluid becomes stable, thereby making it possible to attain a reduction in operation noise, an improvement in controllability and a stabilization of the performance of the electromagnetic valve.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:
1. An electromagnetic valve comprising:
a fixed core;
a movable core disposed so as to advance and retreat relative to the fixed core;
a coil which generates a magnetic field which causes the fixed core and the movable core to attract each other;
a valve body disposed so as to move together with the movable core; and
a valve seat member comprising:
a funnel-shaped valve seat surface which closes a flow path by being brought into abutment with the valve body and
an inlet path formed in a bottom of the valve seat surface,
wherein fluid flows from the inlet path towards the valve body side,
the flow path is opened and closed by retreat and advance of the valve body relative to the valve seat surface,
the valve body comprises:
a semi-spherical seal portion; and
a stem portion which extends from the seal portion towards the movable core and which is integrally formed with the seal portion,
wherein a diameter of an end portion of the seal portion is larger than a diameter of the stem portion, and
a space into which the fluid flows out is defined in an area which is located on an extended line extending from a small diameter end portion to a large diameter end portion of the valve seat surface, wherein the valve body comprises:
a large diameter portion which is provided closer to the movable core than the stem portion and which has a larger diameter than that of the stem portion; and
a diameter expanding portion whose diameter is gradually increased from the stem portion towards the large diameter portion.

2. The electromagnetic valve as set forth in claim 1, wherein the electromagnetic valve is a normally open electromagnetic valve in which the movable core moves the valve body in a valve closing direction by the coil being energized.

3. The electromagnetic valve as set forth in claim 1, further comprising
a retainer which is formed separately from the valve body and is adapted to transmit a movement of the movable core to the valve body.

4. The electromagnetic valve as set forth in claim 1, wherein
the valve body and the movable core are integral with each other.

5. The electromagnetic valve as set forth in claim 1 wherein the diameter expanding portion is a tapered shape and the larger diameter portion is a flange portion.

6. The electromagnetic valve as set forth in claim 5, further comprising a connecting pin formed on the flange portion so as to extend upwards towards the moveable core.

7. The electromagnetic valve as set forth in claim 1, wherein the valve seat member is a flat cylindrically shaped member and the funnel-shaped valve seat surface is formed in a center of an upper surface thereof.

8. The electromagnetic valve as set forth in claim 7, wherein the inlet path is formed in a bottom of the valve seat surface so as to pass through the bottom vertically.

9. The electromagnetic valve as set forth in claim 1, further comprising a ball valve disposed in a lower portion of a return flow path.

10. The electromagnetic valve as set forth in claim 9, further comprising a filter which prevents the ball valve from being dislocated or falling.

11. The electromagnetic valve as set forth in claim 10, wherein the filter is press fitted in an inside diameter at a lower end of a body portion.

12. The electromagnetic valve as set forth in claim 1, further comprising a return spring for generating a biasing force for keeping the valve body apart from the valve seat member disposed between an upper surface of the valve body and a flange portion of the valve body.

13. The electromagnetic valve as set forth in claim 1, further comprising a plurality of through holes formed in a side wall of a body portion surrounding the valve body, the plurality of through holes establishing a communication between an inside and an outside of the body portion.

14. The electromagnetic valve as set forth in claim 13, further comprising a cylindrical filter fitted on the outside of the body portion.

15. The electromagnetic valve as set forth in claim 3, wherein a connecting hole is formed in a lower end face of the retainer which is fitted on a connecting pin of the valve body, whereby the retainer moves together with the valve body.

16. The electromagnetic valve as set forth in claim 15, wherein the retainer is biased upwards together with the valve body by a return spring, and an upper surface of the retainer is brought into abutment with a lower end face of the movable core.

17. The electromagnetic valve as set forth in claim 16, further comprising a plurality of grooves formed in a side surface of the retainer so as to extend along the full length thereof.

\* \* \* \* \*